US009023167B2

(12) United States Patent
Kittle

(10) Patent No.: US 9,023,167 B2
(45) Date of Patent: May 5, 2015

(54) PROCESS FOR APPLYING A POWDER COATING

(75) Inventor: Kevin Jeffrey Kittle, Chester-le-Street (GB)

(73) Assignee: Akzo Nobel Coatings International B.V., Arnhem (NL)

( * ) Notice: Subject to any disclaimer, the term of this patent is extended or adjusted under 35 U.S.C. 154(b) by 898 days.

(21) Appl. No.: 12/596,978

(22) PCT Filed: Apr. 18, 2008

(86) PCT No.: PCT/EP2008/054698

§ 371 (c)(1), (2), (4) Date: Mar. 24, 2010

(87) PCT Pub. No.: WO2008/128977

PCT Pub. Date: Oct. 30, 2008

(65) Prior Publication Data

US 2010/0209676 A1 Aug. 19, 2010

Related U.S. Application Data

(60) Provisional application No. 60/928,748, filed on May 10, 2007.

(30) Foreign Application Priority Data

Apr. 23, 2007 (EP) .................................... 07106687

(51) Int. Cl.

| | |
|---|---|
| ***G03G 15/16*** | (2006.01) |
| ***G03G 15/20*** | (2006.01) |
| ***B29C 65/02*** | (2006.01) |
| ***B32B 37/02*** | (2006.01) |
| ***B32B 37/06*** | (2006.01) |
| ***B32B 38/10*** | (2006.01) |
| ***G03G 7/00*** | (2006.01) |
| ***G03G 13/00*** | (2006.01) |
| *B32B 37/04* | (2006.01) |
| *B05D 1/28* | (2006.01) |
| *B05D 5/06* | (2006.01) |

(52) U.S. Cl.

CPC ................ *G03G 7/0006* (2013.01); *B05D 1/28* (2013.01); *B05D 5/06* (2013.01); *B05D 2401/32* (2013.01); *G03G 7/002* (2013.01); *G03G 13/00* (2013.01); *G03G 15/1605* (2013.01); *G03G 15/1625* (2013.01)

(58) Field of Classification Search

CPC ... G03G 15/1625; G03G 7/002; G03G 13/00; G03G 15/1605; G03G 7/0006

USPC .................. 156/247, 249, 230, 239, 240, 235

See application file for complete search history.

(56) References Cited

U.S. PATENT DOCUMENTS

| | | | | |
|---|---|---|---|---|
| 3,444,732 | A * | 5/1969 | McKinley et al. | 73/150 A |
| 3,877,416 | A | 4/1975 | Donohue et al. | |
| 5,099,336 | A | 3/1992 | Moriya | |
| 5,284,731 | A | 2/1994 | Tyagi et al. | |
| 5,358,820 | A | 10/1994 | Bugner et al. | |
| 5,456,987 | A | 10/1995 | Badesha | |
| 5,526,102 | A * | 6/1996 | Kato | 399/302 |
| 5,955,152 | A | 9/1999 | Yasuda et al. | |
| 6,358,660 | B1 * | 3/2002 | Agler et al. | 430/125.32 |
| 6,793,688 | B2 * | 9/2004 | Tyler et al. | 8/470 |
| 6,957,030 | B2 * | 10/2005 | Baker et al. | 399/222 |
| 7,744,714 | B2 * | 6/2010 | Akimoto | 156/236 |
| 2003/0175047 | A1 * | 9/2003 | Baker et al. | 399/222 |
| 2007/0234918 | A1 * | 10/2007 | Hirahara et al. | 101/483 |

FOREIGN PATENT DOCUMENTS

| | | |
|---|---|---|
| EP | 0 433 950 | 6/1991 |
| EP | 1 296 202 | 3/2003 |
| GB | 2 337 962 | 12/1999 |
| JP | 10-340012 | 12/1998 |
| JP | 2001-117298 | 4/2001 |

OTHER PUBLICATIONS

International Search Report and Written Opinion, International PCT Application No. PCT/EP2008/054698, mailed May 26, 2008.

International Preliminary Report on Patentability, International PCT Application No. PCT/ EP2008/054698, mailed Apr. 27, 2009.

Search Report, European Application No. 07 10 6687, dated Aug. 10, 2007.

* cited by examiner

*Primary Examiner* — Sonya Mazumdar

(74) *Attorney, Agent, or Firm* — Kenyon & Kenyon LLP

(57) ABSTRACT

A process for coating a substrate comprising the sequential steps of (a) providing a transfer sheet provided with a printed powder coating, (b) applying the transfer sheet onto the substrate with the powder coating in contact with the substrate, (c) removing the transfer sheet from the powder coating and (d) curing the powder coating on the substrate.

14 Claims, No Drawings

PROCESS FOR APPLYING A POWDER COATING

REFERENCE TO RELATED APPLICATION(s)

This application is the U.S. National Phase of PCT/EP2008/054698 filed on Apr. 16, 2008 and claims the benefit of U.S. Provisional Application No. 60/928,748 filed on May 10, 2007.

The present invention pertains to a process for applying a powder coating onto a substrate.

Conventionally, powder coatings are applied onto substrates using spray guns or fluidised beds. Both these processes have the disadvantage that they can only deposit powder coatings in a single colour on the entire substrate. Any lettering or other decoration will have to be applied in a separate process step.

U.S. Pat. No. 5,955,152 provides an alternative method for applying a powder coating onto a substrate. This reference describes a method wherein a powder coating is applied onto a substrate via an electrostatic printing process comprising forming an electrostatic latent image on a light-sensitive body, developing the electrostatic latent image by making a thermosetting powder coating material adhere under electrostatic force to the light-sensitive body, transferring the powder coating material on the light-sensitive body onto the substrate to be coated, and curing the powder coating in such a way that it adheres to the substrate. The reference also describes a method wherein the powder coating material on the light-sensitive body is transferred onto a transfer sheet, and the powder coating material is cured as it is pressed against the substrate to be coated, thereby baking the powder coating material onto the substrate; followed by peeling the transfer sheet from the cured coating layer.

While the transfer sheet process described in U.S. Pat. No. 5,955,152 makes it possible to deposit powder coatings with different colours onto a single substrate in a single step, it appears that it still has some disadvantages.

In the first place, it appears that when the transfer sheet is used to apply a decoration on part of a coated substrate, e.g., a logo onto an already coated refrigerator door, the decoration has an added-on appearance which is not attractive.

Further, the application of adjoining transfer sheets, for example when providing a pattern on a very large substrate, is difficult with the method described in this reference. If the transfer sheets are applied simultaneously it is difficult to properly adjoin the patterns, because the transfer sheets are in the way. When the transfer sheets are applied sequentially, that is, one sheet is applied, the coating is cured, the transfer sheet is removed, and the second sheet is applied, good results will also not be obtained because the different patterns will be subjected to different curing conditions.

Further, it sometimes occurs that during curing the powder coating layer is fixed not only to the substrate to be coated, but also to the transfer sheet in such a manner that the transfer sheet cannot be removed without damaging the decoration applied via the powder coating layer. Because the powder coating layer at that point in time is already cured, the decoration cannot be removed anymore. This problem can be alleviated by removing the transfer sheet when the coating layer is still warm, but this places restrictions on process flexibility which are not always desired.

A further disadvantage of the process described in this reference is that it places stringent requirements on the properties of the transfer sheet, as the transfer sheet should be able to withstand the conditions prevailing during curing of the powder coating layer without deforming, tearing, melting, or showing any other behaviour which would detrimentally affect the properties of the final coating or the possibilities for removing the transfer sheet. U.S. Pat. No. 5,955,152 mentions Teflon™ films and heat-resistant silicon-based films, which are quite expensive.

These problems are solved by the process of the present invention. The present invention provides a process for coating a substrate comprising the sequential steps of providing a transfer sheet provided with a printed powder coating, applying the transfer sheet onto the substrate with the powder coating in contact with the substrate, removing the transfer sheet from the powder coating, and curing the powder coating on the substrate.

A characterising feature of the process of the invention is that the transfer sheet is removed from the powder coating before the powder coating is cured. This leads to a number of advantages.

In the first place, it was found that when the powder coating is cured only after the transfer sheet is removed, the surface properties of the cured powder coating will mach those of any underlying coating layer. This means that even when only part of a substrate is provided with a decoration via a transfer sheet, the decoration will form an integral part of the coated substrate, which makes for a much more sophisticated appearance. Further, also when the entire surface of a substrate is provided with a powder coating decoration via the method according to the invention, the resulting decoration has more depth and character of image as compared to the relatively flat results obtained via the method described in U.S. Pat. No. 5,955,152.

In the method of this invention it is also easy to decorations adjoining each other. This can be done by repeating the deposition part of the process, comprising the steps of applying the transfer sheet onto the substrate with the powder coating in contact with the substrate and removing the transfer sheet from the powder coating as many times as desired, and then subjecting the entire decorated substrate to a curing step. As each transfer sheet is applied after the previous transfer sheet has been removed, matching the patterns of the adjoining sheets is not hard. As all decorations will be cured simultaneously, the effects associated with different curing conditions will not occur.

Further, if the powder coating layer is damaged during removal of the transfer sheet, the fact that the powder coating is at that point in time not cured may make for easier removal of the powder coating, so that the substrate can be cleaned and the transfer re-applied.

Additionally, the material of which the transfer sheet is made can be optimised for printing and transfer properties, without having to withstand the conditions prevailing during curing, making a wider selection of materials available for use in the process.

The process according to the invention allows the application of any design in one or more colours onto a substrate in a single step.

Further advantages associated with the process of the present invention will become apparent from the document below.

In the first step of the process according to the invention, a transfer sheet with a printed powder coating is provided. The printing process can be any conventional printing process via which powder materials are applied onto a substrate. Suitable printing processes include those comprising the following steps. In a first step an electrostatic latent image is formed on a light-sensitive body. In a second step the electrostatic latent image is developed by letting the powder coating adhere under electrostatic force to the light-sensitive body. Then, the powder coating material on the light-sensitive body is transferred onto the transfer sheet. For more details on suitable printing processes reference is made to U.S. Pat. No. 5,955,152.

In one embodiment a plurality of powder coatings of different colours are sequentially printed onto the transfer sheet, for example by means of the latent-image forming step, developing step and transfer step. Then the plurality of powder coatings are transferred onto the substrate, followed by removal of the transfer sheet and curing. This provides an easy method of providing a substrate coated with a design containing multiple colours. It should also be noted that the use of a transfer sheet makes for a more risk-free coating process than direct coating onto the substrate, in that a miss-print on a transfer sheet is less expensive than a miss-print on a final substrate.

In one embodiment that substrate is provided with a coating before it is subjected to the process according to the invention. This base coat may have any color, but especially when it is white, base colour of the substrate will not influence the colour of the final coated substrate. The base coat may be a fully cured coating layer (preferably a powder coating), it may have been only partially cured, or it may be a melted uncured powder coating. The latter is preferred.

In one embodiment the plurality of types of powder coating materials include powder coating materials of the standard printing colours cyan, yellow, magenta, and black. This will allow the provision of any desired colour on a white substrate.

In one embodiment of the present invention the powder coating on the transfer sheet is submitted to a temporary fixing step in which the powder coating is heated to a temperature below its curing temperature in such a way that it is temporarily fixed on the transfer sheet. The powder coating is heated sufficiently to induce some flow between the powder coating particles, but insufficiently to cause any substantial curing of the powder coating. If so desired, the powder coating is pressed to the transfer sheet during the temporary fixing step, e.g., by using rollers.

If so desired, a protective sheet may be applied onto the powder coating layer to protect the coating layer against being damaged. This may be of interest for the powder coating as such and for the powder coating layer after it has been submitted to a temporary fixing step.

Any suitable material can be used for the protective sheet, as long as it can be removed from the powder coating layer without damaging it. Suitable materials will be evident to the skilled person and include conventional release paper such as waxed paper of grease-proof paper.

The next step in the process according to the invention is applying the transfer sheet on the substrate with the powder coating in contact with the substrate. The transfer sheet may be applied to a flat surface, but may also be folded around a three-dimensional structure.

How this process step should be carried out will be evident to the skilled person. It may be appropriate to press the transfer sheet against the substrate using rollers or other pressure-generating apparatus. It is also possible, as is known in the art, to cover the substrate with the transfer sheet and then apply a vacuum to press the transfer sheet to the substrate. To increase the adherence of the powder coating to the substrate is necessary for the powder coating to be heated above its melt temperature while in contact with the substrate. In general, the conditions during this transfer step should be chosen such that no substantial curing of the powder coating is observed. In general this means that this process should be done quite rapid and the temperature should not be chosen too high. In general, the powder coating is heated to a temperature of at least 2° C. above the melt temperature, preferably at least 5° C., more preferably at least 10° C. In general, a higher temperature is preferred as this will increase the adherence of the powder coating to the substrate.

Since it is not intended to cure the powder coating at this stage, the temperature of the powder coating should be kept substantially below its curing temperature, e.g., at least 2° C. below its curing temperature, preferably at least 5° C., more preferably at least 10° C.

Then, the transfer sheet is removed from the powder coating. This should be done at a temperature below the melt temperature of the powder coating, e.g., at least 2° C. below the melt temperature, preferably at least 5° C., more preferably at least 10° C.

The powder coating layer will be retained on the substrate.

Finally, the powder coating layer is subjected to a curing step in which the powder coating is cured to provide internal integrity and adhesion to the substrate. Preferably, heat curing is used. Curing powder coatings is standard technology and requires no further elucidation.

In a further embodiment, another powder coating layer is applied using a transfer sheet, before the curing step of the first coating layer that was applied via a transfer sheet powder coating. In such process sequential layers of powder coating are applied using a transfer sheet before the final curing step. This embodiment enables the preparation of a powder coating layer on a substrate with various textures and/or the building of a 3-dimensional structure in the coating layer on the substrate.

This embodiment can be characterized as a process having the sequential steps of 1. providing a transfer sheet provided with a printed powder coating
2. applying the transfer sheet onto the substrate with the powder coating in contact with the substrate
3. removing the transfer sheet from the powder coating
4. applying another transfer sheet provided with a printed powder coating onto the previously coated substrate with the powder coating in contact with the previously coated substrate
5. removing the transfer sheet from the powder coating.
6. curing the powder coating on the substrate Further steps 4 and 5 can be introduced once initial steps 4 and 5 have been completed.

The powder coating used in the process according to the invention is a thermosetting powder coating composition which comprises a resin and a curing agent therefore. This differentiates powder coatings from conventional toners: the latter do not contain a curing agent.

The powder coating may further comprise one or more of the conventional powder coating additives like pigments, fillers, and opacifyers.

The present invention is not limited to the embodiments discussed above. For example, there is no limitation on the colours of the powder coating materials. If so desired, the substrate may be pre-coated with liquid coatings or powder coatings via conventional methods. It may be preferred for the substrate to have been provided with a coating layer with a thickness of 1-200 microns, in particular 10-150 microns. The coating layer being a powder coating layer may be particularly preferred.

The invention claimed is:

1. A process for coating a substrate comprising the sequential steps of:

Providing a transfer sheet provided with a printed powder coating

Applying the transfer sheet onto the substrate with the powder coating in contact with the substrate Increasing the adherence of the powder coating to the substrate by heating said powder coating to a temperature above its melt temperature but substantially below its curing temperature Removing the transfer sheet from the powder coating Curing the powder coating on the substrate after the step of removing the transfer sheet from the powder coating.

2. The process of claim 1, wherein the transfer sheet provided with a printed coating is provided by a process comprising the steps of forming an electrostatic latent image on a light-sensitive body, developing the electrostatic latent image by making the powder coating adhere to the light-sensitive body, and transferring the powder coating on the light-sensitive body onto the transfer sheet.

3. The process of claim 1, wherein a plurality of powder coatings of different colours are sequentially printed onto the transfer sheet.

4. The process of claim 3, wherein the plurality of powder coating include powder coatings of the standard printing colours, cyan, yellow, magenta, and black.

5. The process of claim 1, wherein the transfer sheet is folded around a three-dimensional structure.

6. The process of claim 1, wherein the powder coating is temporarily fixed to the transfer sheet by way of a temporary fixing step in which the powder coating is heated to a temperature below its curing temperature.

7. The process of claim 1, wherein the substrate to be coated has a coating layer, in particular a powder coating layer, with a thickness of 1-200 microns.

8. The process of claim 1, wherein in the step of heating the powder coating to increase its adherence to the substrate, the powder coating is heated to a temperature at least 2° C. above its melt temperature.

9. The process of claim 1, wherein in the step of heating the powder coating to increase its adherence to the substrate, the powder coating is heated to a temperature at least at least 2° C. below its curing temperature.

10. The process of claim 1, wherein after the transfer sheet is removed from the powder coating, the following sequential steps are inserted before the curing of the powder coating on the substrate Applying another transfer sheet provided with a printed powder coating onto the previously coated substrate with the powder coating in contact with the previously coated substrate Removing the transfer sheet from the powder coating.

11. The process of claim 1, wherein in the step of heating the powder coating to increase its adherence to the substrate, the powder coating is heated to a temperature at least 5° C. above its melt temperature.

12. The process of claim 1, wherein in the step of heating the powder coating to increase its adherence to the substrate, the powder coating is heated to a temperature at least 10° C. above its melt temperature.

13. The process of claim 1, wherein in the step of heating the powder coating to increase its adherence to the substrate, the powder coating is heated to a temperature at least 5° C. below its curing temperature.

14. The process of claim 1, wherein in the step of heating the powder coating to increase its adherence to the substrate, the powder coating is heated to a temperature at least 10° C. below its curing temperature.

* * * * *